United States Patent
Lundström

(10) Patent No.: US 12,180,906 B2
(45) Date of Patent: Dec. 31, 2024

(54) METHOD OF DIAGNOSING A COMBUSTION ENGINE ASSEMBLY, CONTROL ARRANGEMENT, COMBUSTION ENGINE ASSEMBLY, AND VEHICLE

(71) Applicant: Scania CV AB, Södertälje (SE)

(72) Inventor: Mikael Lundström, Hägersten (SE)

(73) Assignee: Scania CV AB, Södertälje (SE)

(*) Notice: Subject to any disclaimer, the term of this patent is extended or adjusted under 35 U.S.C. 154(b) by 0 days.

(21) Appl. No.: 18/239,347

(22) Filed: Aug. 29, 2023

(65) Prior Publication Data
US 2024/0068421 A1   Feb. 29, 2024

(30) Foreign Application Priority Data
Aug. 31, 2022  (SE) .................................. 2251005-1

(51) Int. Cl.
*F02D 41/22*  (2006.01)
*F01N 3/20*   (2006.01)
(Continued)

(52) U.S. Cl.
CPC ........... *F02D 41/22* (2013.01); *F01N 3/2066* (2013.01); *F01N 11/00* (2013.01);
(Continued)

(58) Field of Classification Search
CPC .... F02D 41/22; F02D 41/1463; F01N 3/2066; F01N 11/00; F01N 2560/026; F01N 2900/1402
See application file for complete search history.

(56) References Cited

U.S. PATENT DOCUMENTS 9,784,166 B2   10/2017  Osburn et al.
2010/0154386 A1   6/2010  Perrin et al.
(Continued)

FOREIGN PATENT DOCUMENTS

CN   106894868 A   *   6/2017
CN   112682146 A   *   4/2021
(Continued)

OTHER PUBLICATIONS

Aug. 3, 2023—(SE) Notice of Rejection—App 2251005-1—Eng Translation.
(SE) Novelty Search—App. No. 2251005-1.

*Primary Examiner* — Joseph J Dallo
(74) *Attorney, Agent, or Firm* — Banner & Witcoff, Ltd.

(57) ABSTRACT

A method of diagnosing an operational performance of a combustion engine assembly is disclosed, the combustion engine assembly comprising a combustion engine, and an exhaust system. The exhaust system comprises a SCR catalyst and a NOx sensor arranged downstream of the SCR catalyst. The method comprises the steps of providing a first NOx value (v1) using the NOx sensor during a supply period (p1) of an exhaust additive, providing a second NOx value (v2) using the NOx sensor during a stop period (p2) of a supply of exhaust additive, and diagnosing the operational performance of the combustion engine assembly based on a ratio between the first and second NOx values (v1, v2). The present disclosure further relates to a computer program, a computer-readable medium, a control arrangement, a combustion engine assembly, and a vehicle.

9 Claims, 2 Drawing Sheets

(51) Int. Cl.
*F01N 11/00* (2006.01)
*F02D 41/14* (2006.01)

(52) U.S. Cl.
CPC .... *F02D 41/1463* (2013.01); *F01N 2560/026* (2013.01); *F01N 2900/1402* (2013.01)

(56) References Cited

U.S. PATENT DOCUMENTS

| | | | |
|---|---|---|---|
| 2012/0222406 A1* | 9/2012 | Sakurai | F01N 3/0842 60/276 |
| 2012/0233984 A1 | 9/2012 | Levijoki et al. | |
| 2013/0058833 A1* | 3/2013 | Onodera | F01N 13/009 422/111 |
| 2014/0039781 A1* | 2/2014 | Theis | F01N 13/011 701/112 |
| 2014/0150409 A1* | 6/2014 | George | F01N 9/00 60/274 |
| 2014/0311443 A1* | 10/2014 | Leone | F02B 47/02 123/25 R |
| 2015/0113953 A1 | 4/2015 | Nilsson | |
| 2015/0128565 A1 | 5/2015 | Upadhyay et al. | |
| 2018/0023450 A1* | 1/2018 | Zhang | F01N 3/023 60/602 |
| 2019/0242288 A1 | 8/2019 | Sappok et al. | |

FOREIGN PATENT DOCUMENTS

| | | | | |
|---|---|---|---|---|
| DE | 102016211572 A1 | 12/2017 | | |
| EP | 2813693 B1 | 4/2018 | | |
| JP | 2008133780 A | 6/2008 | | |
| JP | 2009036055 A * | 2/2009 | | |
| SE | 638625 C2 | 10/2016 | | |
| WO | 9925966 A1 | 5/1999 | | |
| WO | 2012117183 A1 | 9/2012 | | |
| WO | WO-2015045378 A1 * | 4/2015 | | F01N 11/00 |
| WO | WO-2020214920 A1 * | 10/2020 | | F01N 11/00 |
| WO | WO-2021101837 A1 * | 5/2021 | | B01D 53/02 |

* cited by examiner

METHOD OF DIAGNOSING A COMBUSTION ENGINE ASSEMBLY, CONTROL ARRANGEMENT, COMBUSTION ENGINE ASSEMBLY, AND VEHICLE

CROSS-REFERENCE TO RELATED APPLICATIONS

This Application claims the benefit of priority from SE Application 2251005-1 filed on Aug. 31, 2022 in Sweden. The entire contents of the aforementioned one or more applications are incorporated herein by reference in their entirety.

TECHNICAL FIELD

The present disclosure relates to a method of diagnosing an operational performance of a combustion engine assembly. The present disclosure further relates to a computer program, a computer-readable medium, a control arrangement for a combustion engine assembly, a combustion engine assembly, and a vehicle comprising a combustion engine assembly.

BACKGROUND

Internal combustion engines, such as four-stroke internal combustion engines, comprise one or more cylinders and a piston arranged in each cylinder. The pistons are connected to a crankshaft of the engine and are arranged to reciprocate within the cylinders upon rotation of the crankshaft. The engine usually further comprises one or more inlet valves and outlet valves as well as one or more fuel supply arrangements. The one or more inlet valves and outlet valves are controlled by a respective valve control arrangement usually comprising one or more camshafts rotatably connected to a crankshaft of the engine, via a belt, chain, gears, or similar. A four-stroke internal combustion engine completes four separate strokes while turning a crankshaft. A stroke refers to the full travel of the piston along the cylinder, in either direction.

General problems when designing an internal combustion engine is the emission levels from the engine and the fuel consumption of the engine. The emission levels of carbon dioxide CO 2 are directly correlated to the fuel consumption of the engine. Moreover, exhausts from an engine can comprise carbon monoxide CO from incomplete combustion, hydrocarbons HC from unburnt fuel, nitrogen oxides NOx from high combustion temperatures, and particulate matter which is usually abbreviated PM and consists mostly of soot/smoke.

Environmental concerns, as well as emissions standards for motor vehicles, have led to the development of combustion engine assemblies using exhaust additives, such as reducing agents for diesel, and/or ethanol, exhaust gases. Reducing agents may comprise an aqueous urea solution and may be used as a consumable in a Selective Catalytic Reduction SCR in order to lower nitrogen oxides NOx concentration in exhaust emissions from the internal combustion engine. A selective catalytic reduction arrangement is a means of converting nitrogen oxides NOx with the aid of a catalyst into diatomic nitrogen N2, and water H2O using a reduction agent added to a stream of exhaust gas which is adsorbed onto a catalyst substrate of the SCR catalyst. The reduction agent may comprise a gaseous reductant, typically anhydrous ammonia, aqueous ammonia, or urea. Function of these exhaust after treatment systems rely on the high temperature of the exhaust gases. Some exhaust systems have been developed comprising two or more SCR catalysts arranged in series.

An engine is typically operated to minimize the temperature of the exhaust gas, since there is a correlation between engine efficiency and remaining gas temperature after the gas has left the cylinder system. That is, ideally, the engine should have a fast combustion event close to the top dead centre TDC, followed by a relatively long expansion of the gas in the expansion stroke to get as much engine brake torque per fuel amount. A fast combustion close to the top dead centre TDC gives high peak temperatures and pressures in the combustion chamber.

Nitrogen oxides NOx are formed by a reaction between oxygen O2 and nitrogen N upon high temperatures and pressures in a cylinder of an engine. In other words, when the operation of the engine is optimized with regards to fuel efficiency, large amounts of nitrogen oxides NOx may be formed.

The term NOx represents several forms of nitrogen oxides such as nitric oxide NO and nitrogen dioxide $NO_2$. A nitrogen oxide sensor, also referred to as a NOx sensor, is a device which can be used to detect nitrogen oxides in a stream of exhaust gas from an internal combustion engine. Due to the harsh environment inside an exhaust system of a combustion engine with high pressures and temperatures, NOx sensors can become damaged especially if mounted at, or close to, an exhaust manifold of the engine upstream of a first SCR catalyst in the exhaust system.

Moreover, NOx sensors are sensitive components and the positioning of a NOx sensor in an exhaust system is a challenge due to the harsh environment with high pressures and temperatures in the exhaust system. Furthermore, NOx sensors are costly components.

For these reasons, some combustion engines lack a NOx sensor upstream of a SCR catalyst and instead only comprises one or more NOx sensors downstream of the SCR catalyst. Moreover, as indicated above, in engines comprising a NOx sensor upstream of the SCR catalyst, the NOx sensor may become damaged. In either of these cases, it can be difficult to distinguish between whether a high NOx content in the exhaust gas downstream of the SCR catalyst is caused by an operational fault of the combustion engine or is caused by an operational fault of the SCR catalyst. That is, a high NOx content in the exhaust gas downstream of the SCR catalyst, measured by a NOx sensor arranged downstream of the SCR catalyst, can be caused by an excessive generation of NOx inside cylinders of the combustion engine and can be caused by an insufficient NOx conversion inside the SCR catalyst.

Furthermore, generally, on today's consumer market, it is an advantage if products, such as combustion engines and associated components, systems, and arrangements, have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a method of diagnosing an operational performance of a combustion engine assembly, wherein the combustion engine assembly comprises an internal combustion engine and an exhaust system configured to conduct a stream of exhaust gas from the internal combustion engine, wherein the exhaust system comprises a SCR catalyst and a NOx sensor arranged downstream of the SCR catalyst, and wherein the method comprises the steps of:

providing a first NOx value using the NOx sensor during a supply period of an exhaust additive to the stream of exhaust gas upstream of the SCR catalyst, providing a second NOx value using the NOx sensor during a stop period of a supply of exhaust additive to the stream of exhaust gas upstream of the SCR catalyst, and diagnosing the operational performance of the combustion engine assembly based on a ratio between the first and second NOx values.

Since the method comprises the step of diagnosing the operational performance of the combustion engine assembly based on a ratio between the first and second NOx values, a simple, efficient, and reliable method is provided having conditions for distinguishing whether a high NOx content in the exhaust gas downstream of the SCR catalyst is caused by an operational fault of the combustion engine or is caused by an operational fault of the SCR catalyst.

This is because the first NOx value is provided during the supply period whereas the second NOx value is provided during the stop period. It can be expected that no conversion of NOx occurs in the SCR catalyst when the second NOx value is provided because no exhaust additive is supplied to the stream of exhaust gas upstream of the SCR catalyst during the stop period. Since the first NOx value is provided during the supply period, in which exhaust additive is supplied to the stream of exhaust gas inside the exhaust system at a position upstream of the SCR catalyst, a conversation of NOx in the SCR catalyst can be expected when providing the first NOx value. Thereby, the ratio between the first and second NOx values can indicate whether a high NOx content in the exhaust gas downstream of the SCR catalyst is caused by an operational fault of the combustion engine or is caused by an operational fault of the SCR catalyst.

Furthermore, since the method comprises the step of diagnosing the operational performance of the combustion engine assembly based on the ratio between the first and second NOx values, a method is provided having conditions for circumventing the need for a NOx sensor upstream of the SCR catalyst where harsher conditions are prevalent in terms of pressure and temperatures as compared to locations downstream of the SCR catalyst. Accordingly, a method is provided having conditions for improving durability and reliability of combustion engine assemblies as well as having conditions for reducing manufacturing and assembling costs of combustion engine assemblies.

Accordingly, a method is provided overcoming, or at least alleviating, at least some of the above-mentioned problems and drawbacks. As a result, the above-mentioned object is achieved.

Optionally, the step of diagnosing the performance of the combustion engine assembly comprises the step of:

setting a fault indicator of at least one of the internal combustion engine and the SCR catalyst if the ratio between the first and second NOx values is greater than a threshold ratio.

Thereby, a simple, efficient, and reliable method is provided having conditions for distinguishing whether a high NOx content in the exhaust gas downstream of the SCR catalyst is caused by an operational fault of the combustion engine or is caused by an operational fault of the SCR catalyst.

This is because a large ratio between the first and second NOx values can indicate whether a high NOx content in the exhaust gas downstream of the SCR catalyst is caused by an operational fault of the combustion engine or is caused by an operational fault of the SCR catalyst.

Moreover, by setting the fault indicator, another device and/or user can obtain information indicating whether a high NOx content in the exhaust gas downstream of the SCR catalyst is caused by an operational fault of the combustion engine or is caused by an operational fault of the SCR catalyst.

Optionally, the method comprises the steps of:

providing current operational data of the internal combustion engine during the step of providing the second NOx value, and providing a specific NOx content value based on the second NOx value and on the current operational data, and wherein the step of diagnosing the performance of the combustion engine assembly comprises the step of:

setting a fault indicator of the SCR catalyst if the ratio between the first and second NOx values is greater than the threshold ratio and the specific NOx content value is smaller than a threshold value.

Thereby, a simple, efficient, and reliable method is provided having conditions for distinguishing whether a high NOx content in the exhaust gas downstream of the SCR catalyst is caused by an operational fault of the SCR catalyst. This is because a large ratio between the first and second NOx values and a small specific NOx content value can indicate the presence of an operational fault of the SCR catalyst.

Moreover, by setting the fault indicator, another device and/or user can obtain information indicating an operational fault of the SCR catalyst.

Optionally, the method comprises the steps of:

providing current operational data of the internal combustion engine during the step of providing the second NOx value, and providing a specific NOx content value based on the second NOx value and on the current operational data, and wherein the step of diagnosing the performance of the combustion engine assembly comprises the step of:

setting a fault indicator of the internal combustion engine if the specific NOx content value is greater than a threshold value.

Thereby, a simple, efficient, and reliable method is provided having conditions for distinguishing whether a high NOx content in the exhaust gas downstream of the SCR catalyst is caused by an operational fault of the internal combustion engine. This is because a high specific NOx content value can indicate the presence of an operational fault of the internal combustion engine.

Moreover, by setting a fault indicator, another device and/or user can obtain information indicating the presence of an operational fault of the internal combustion engine.

The step of setting a fault indicator of the internal combustion engine if the specific NOx content value is greater than a threshold value may be performed if the ratio between the first and second NOx values is greater than the threshold ratio.

Optionally, the method comprises the step of:

controlling the internal combustion engine to operate within a predetermined speed range during the steps of providing the first and second NOx values.

Thereby, an even more accurate and reliable method is provided. This is because the operation of the internal combustion engine within the predetermined speed range during the steps of providing the first and second NOx values can provide more accurate first and second NOx values.

Moreover, conditions are provided for a faster method of diagnosing the operational performance of the combustion engine assembly. This is because a faster removal of accumulated exhaust additive from the SCR catalyst can be ensured before providing the second NOx value. Moreover, by controlling the internal combustion engine to operate within the predetermined speed range, a sufficient exhaust temperature can be obtained which provides conditions for more accurate first and second NOx values. Purely as an example, the predetermined speed range may be within 1 000-1 200 revolutions per minute.

Optionally, the method comprises the step of:
controlling the combustion engine assembly to generate an exhaust temperature within a predetermined temperature range during the steps of providing the first and second NOx values.

Thereby, an even more accurate and reliable method is provided. This is because the controlling of the combustion engine assembly to generate an exhaust temperature within a predetermined temperature range during the steps of providing the first and second NOx values can provide more accurate first and second NOx values, and especially a more accurate first NOx value because the NOx conversion in the SCR catalyst is highly dependent on the temperature of exhaust led through the SCR catalyst.

Moreover, conditions are provided for a faster method of diagnosing the operational performance of the combustion engine assembly. This is because it can be ensured that the SCR catalyst is emptied from accumulated exhaust additive before providing the second NOx value.

Purely as an example, the predetermined temperature range may be within 200-300 degrees Celsius, or may be within 250-300 degrees Celsius.

The combustion engine assembly may be controlled to generate an exhaust temperature within a predetermined temperature range by controlling one or more of:
a fuel injection amount into cylinders of the internal combustion engine,
a fuel injection duration into cylinders of the internal combustion engine,
a fuel injection timing into cylinders of the internal combustion engine,
a timing of opening and/or closing events of valves of the internal combustion engine,
an opening state of an exhaust throttle arranged in the exhaust system of the combustion engine assembly,
an opening state of an air inlet throttle arranged in an air inlet system of the combustion engine assembly, and
a fuel injection amount into the exhaust system.

Optionally, the step of providing the second NOx value comprises the step of:
providing the second NOx value a predetermined time after an initiation of the stop period.

Thereby, an even more accurate and reliable method is provided. This is because it can be ensured that any exhaust additive accumulated onto a catalyst substrate of the SCR catalyst is removed from the catalyst substrate before providing the second NOx value, which provides conditions for more accurate second NOx values.

Optionally, the method comprises the step of, prior to the step of providing the first NOx value:
supplying a predetermined flow rate of exhaust additive to the stream of exhaust gas upstream of the SCR catalyst during the supply period.

Thereby, an even more accurate and reliable method is provided. This is because more accurate first NOx values can be provided due to the predetermined flow rate of exhaust additive to the stream of exhaust gas during the supply period.

Optionally, the combustion engine assembly comprises an exhaust additive dosing arrangement configured to supply the exhaust additive to the stream of exhaust gas in the exhaust system at a position upstream of the SCR catalyst, and
wherein the method comprises the step of, prior to the step of providing the first NOx value:
supplying exhaust additive to the stream of exhaust gas by controlling the exhaust additive dosing arrangement to supply the exhaust additive to the stream of exhaust gas during the supply period.

Thereby, a simple, efficient, and accurate method is provided having conditions for distinguishing whether a high NOx content in the exhaust gas downstream of the SCR catalyst is caused by an operational fault of the combustion engine or is caused by an operational fault of the SCR catalyst.

Optionally, the method comprises the step of, prior to the step of providing the second NOx value:
initiating the stop period by controlling the exhaust additive dosing arrangement to stop the supply of exhaust additive to the stream of exhaust gas.

Thereby, conditions are provided for an even more accurate and reliable method. This is because it can be ensured that no exhaust additive is supplied to the stream of exhaust gas during the stop period. Since the method comprises the step of providing the second NOx value during the stop period, conditions are provided for more accurate and reliable second NOx values.

According to a second aspect of the invention, the object is achieved by a computer program comprising instructions which, when the program is executed by a computer, cause the computer to carry out the method according to some embodiments of the present disclosure. Since the computer program comprises instructions which, when the program is executed by a computer, cause the computer to carry out the method according to some embodiments, a computer program is provided which provides conditions for overcoming, or at least alleviating, at least some of the above-mentioned drawbacks. As a result, the above-mentioned object is achieved.

According to a third aspect of the invention, the object is achieved by a computer-readable medium comprising instructions which, when executed by a computer, cause the computer to carry out the method according to some embodiments of the present disclosure. Since the computer-readable medium comprises instructions which, when the program is executed by a computer, cause the computer to carry out the method according to some embodiments, a computer-readable medium is provided which provides conditions for overcoming, or at least alleviating, at least some of the above-mentioned drawbacks. As a result, the above-mentioned object is achieved.

According to a fourth aspect of the invention, the object is achieved by a control arrangement for a combustion engine assembly,
the combustion engine assembly comprising:
an internal combustion engine, and
an exhaust system configured to conduct a stream of exhaust gas from the internal combustion engine,
the exhaust system comprising a SCR catalyst and a NOx sensor arranged downstream of the SCR catalyst, wherein the control arrangement is configured to:
provide a first NOx value using the NOx sensor during a supply period of an exhaust additive to the stream of exhaust gas upstream of the SCR catalyst,
provide a second NOx value using the NOx sensor during a stop period of a supply of exhaust additive to the stream of exhaust gas upstream of the SCR catalyst, and
diagnose the operational performance of the combustion engine assembly based on a ratio between the first and second NOx values.

Since the control arrangement is configured to diagnose the operational performance of the combustion engine assembly based on a ratio between the first and second NOx values, a control arrangement is provided having conditions for distinguishing whether a high NOx content in the exhaust gas downstream of the SCR catalyst is caused by an operational fault of the combustion engine or is caused by an operational fault of the SCR catalyst in a simple, efficient, and reliable manner.

This is because the first NOx value is provided during the supply period whereas the second NOx value is provided during the stop period. Thereby, the ratio between the first and second NOx values can indicate whether a high NOx content in the exhaust gas downstream of the SCR catalyst is caused by an operational fault of the combustion engine or is caused by an operational fault of the SCR catalyst.

Furthermore, a control arrangement is provided having conditions for circumventing the need for a NOx sensor upstream of the SCR catalyst where harsher conditions are prevalent in terms of pressure and temperatures as compared to downstream of the SCR catalyst. Accordingly, a control arrangement is provided having conditions for improving durability and reliability of combustion engine assemblies as well as having conditions for reducing manufacturing and assembling costs of combustion engine assemblies.

Accordingly, a control arrangement is provided overcoming, or at least alleviating, at least some of the above-mentioned problems and drawbacks. As a result, the above-mentioned object is achieved.

It will be appreciated that the various embodiments described for the method are all combinable with the control arrangement as described herein. That is, the control arrangement according to the fourth aspect of the invention may be configured to perform any one of the method steps of the method according to the first aspect of the invention.

The control arrangement, as referred to herein, may be comprised in the combustion engine assembly and/or a vehicle comprising the combustion engine assembly. However, according to some embodiments, at least part of the control arrangement, as referred to herein, may be arranged in an external device, such as in an external diagnostic tool for a combustion engine assembly.

Some or all of the steps of the method according to the first aspect of the invention may be performed during travelling of a vehicle comprising the combustion engine assembly, or during standstill of a vehicle comprising the combustion engine assembly, such as during standstill at a workshop for vehicles.

According to a fifth aspect of the invention, the object is achieved by a combustion engine assembly comprising:
an internal combustion engine, and
an exhaust system configured to conduct a stream of exhaust gas from the internal combustion engine,
the exhaust system comprising a SCR catalyst and a NOx sensor arranged downstream of the SCR catalyst,
wherein the combustion engine assembly comprises a control arrangement,
wherein the control arrangement is configured to:
provide a first NOx value using the NOx sensor during a supply period of an exhaust additive to the stream of exhaust gas upstream of the SCR catalyst,
provide a second NOx value using the NOx sensor during a stop period of a supply of exhaust additive to the stream of exhaust gas upstream of the SCR catalyst, and
diagnose the operational performance of the combustion engine assembly based on a ratio between the first and second NOx values.

Since the combustion engine assembly comprises a control arrangement configured to diagnose the operational performance of the combustion engine assembly based on a ratio between the first and second NOx values, a combustion engine assembly is provided having conditions for distinguishing whether a high NOx content in the exhaust gas downstream of the SCR catalyst is caused by an operational fault of the combustion engine or is caused by an operational fault of the SCR catalyst in a simple, efficient, and reliable manner.

Furthermore, a combustion engine assembly is provided having conditions for circumventing the need for a NOx sensor upstream of the SCR catalyst where harsher conditions are prevalent in terms of pressure and temperatures as compared to downstream of the SCR catalyst. Accordingly, a combustion engine assembly is provided having conditions for improved durability and reliability as well as having conditions for reduced manufacturing and assembling costs.

Accordingly, a combustion engine assembly is provided overcoming, or at least alleviating, at least some of the above-mentioned problems and drawbacks. As a result, the above-mentioned object is achieved.

According to a sixth aspect of the invention, the object is achieved by a vehicle comprising a combustion engine assembly according to some embodiments of the present disclosure.

Since the vehicle comprises a combustion engine assembly according to some embodiments, a vehicle is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
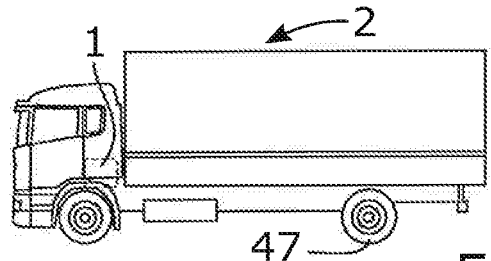
FIG. 1 schematically illustrates a vehicle according to some embodiments of the present disclosure, FIG. 2 schematically illustrates a combustion engine assembly of the vehicle illustrated in FIG. 1, FIG. 3 schematically illustrates a method of diagnosing an operational performance of a combustion engine assembly, FIG. 4a schematically illustrates a first timeline indicating when some of the steps of the method according to embodiments herein may be performed, FIG. 4b schematically illustrates a second timeline indicating when some of the steps of the method according to embodiments herein may be performed.

FIG. 1 schematically illustrates a vehicle 2 according to some embodiments of the present disclosure. According to the illustrated embodiments, the vehicle 2 is a truck, i.e., a type of heavy vehicle. According to further embodiments, the vehicle 2, as referred to herein, may be another type of heavy or lighter type of manned or unmanned vehicle for land or water-based propulsion such as a lorry, a bus, a construction vehicle, a tractor, a car, a ship, a boat, or the like.

The vehicle 2 comprises a combustion engine assembly 1. According to the illustrated embodiments, the combustion engine assembly 1 is configured to provide motive power to the vehicle 2 via wheels 47 of the vehicle 2.

Figure 2:
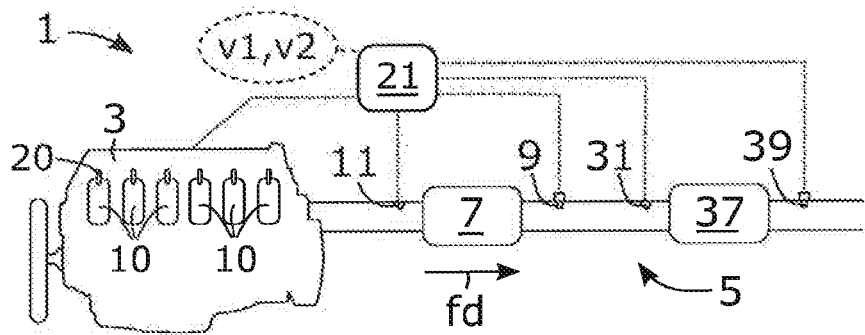

FIG. 2 schematically illustrates the combustion engine assembly 1 of the vehicle 2 illustrated in FIG. 1. The combustion engine assembly 1 comprises an internal combustion engine 3 and an exhaust system 5. The exhaust system 5 is configured to conduct a stream of exhaust gas from the internal combustion engine 3 to the surroundings.

The internal combustion engine 3 is in some places herein referred to as the "combustion engine 3", or simply "the engine 3", for reasons of brevity and clarity. Below, simultaneous reference is made to FIG. 1 and FIG. 2, if not indicated otherwise.

As understood from the above, the internal combustion engine 3 of the combustion engine assembly 1 is configured to provide motive power to the vehicle 2 via wheels 47 of the vehicle 2. Moreover, the vehicle 2 may comprise one or more electric propulsion motors in addition to the internal combustion engine 3 for providing motive power to the vehicle 2. Thus, the vehicle 2, as referred to herein, may comprise a so-called hybrid electric powertrain comprising one or more electric propulsion motors in addition to the combustion engine 3 for providing motive power to the vehicle 2. Furthermore, the combustion engine assembly 1, as referred to herein, may be arranged to power another type of device, unit, or system than a vehicle 2, such as for example a ship, a boat, an electric generator, or the like.

According to the illustrated embodiments, the internal combustion engine 3 comprises six cylinders 10 arranged in one row. The internal combustion engine 3 according to the illustrated embodiments may therefore be referred to an inline-six engine. However, according to further embodiments, the internal combustion engine 3, as referred to herein, may comprise another number of cylinders 10. Moreover, the cylinders 10 of the internal combustion engine 3 may be arranged in another configuration than in one row, such as in two or more rows.

According to embodiments herein, the internal combustion engine 3 is a four-stroke internal combustion engine. Moreover, according to the illustrated embodiments, the internal combustion engine 3 is a diesel engine, i.e., a type of compression ignition engine. The internal combustion engine 3 may thus be a compression ignition engine configured to operate on diesel or a diesel-like fuel, such as biodiesel, biomass to liquid (BTL), or gas to liquid (GTL) diesel. Diesel-like fuels, such as biodiesel, can be obtained from renewable sources such as vegetable oil which mainly comprises fatty acid methyl esters (FAME). Diesel-like fuels can be produced from many types of oils, such as rapeseed oil (rapeseed methyl ester, RME) and soybean oil (soy methyl ester, SME).

According to further embodiments, the internal combustion engine 3, as referred to herein, may be an Otto engine with a spark-ignition device, wherein the Otto engine may be configured to run on petrol, alcohol, similar volatile fuels, or combinations thereof. Alcohol, such as ethanol, can be derived from renewable biomass.

Each cylinder 10 of the internal combustion engine 3 comprises a piston connected to a crankshaft of the internal combustion engine 3, wherein the piston is configured to reciprocate in the cylinder upon rotation of the crankshaft. Combustion chambers are formed between a piston top and cylinder walls of the cylinders 10 of the internal combustion engine 3.

The internal combustion engine 3 comprises a number of fuel injectors 20, wherein each fuel injector 20 is configured to inject fuel into a combustion chamber of the internal combustion engine 3. In other words, according to the illustrated embodiments, the internal combustion engine 3 comprises the same number of fuel injectors 20 as the number of cylinders 10. However, in FIG. 2, only one fuel injector 20 has been provided with the reference sign "20" for reasons of brevity and clarity.

The exhaust system 5 of the combustion engine assembly 1 comprises a SCR catalyst 7 and a NOx sensor 9. The NOx sensor 9 is arranged downstream of the SCR catalyst 7. The NOx sensor 9 is arranged such that a sensing portion thereof is in contact with a portion of the stream of exhaust gas flowing through the exhaust system 5 during operation of the internal combustion engine 3. The NOx sensor 9 is a device capable of detecting nitrogen oxides in the stream of exhaust gas through the exhaust system 5. The NOx sensor 9 may also be referred to as a nitrogen oxide sensor.

The feature that the NOx sensor 9 is arranged downstream of the SCR catalyst 7 means that the NOx sensor 9 is arranged after the SCR catalyst 7 as seen relative a flow direction fd of the exhaust gas flowing through the exhaust system 5 during operation of the internal combustion engine 3. That is, the feature that the NOx sensor 9 is arranged downstream of the SCR catalyst 7 means that exhaust gas flowing through the exhaust system 5 during operation of the internal combustion engine 3 first passes through the SCR catalyst 7 and then reaches the sensing portion of the NOx sensor 9.

The combustion engine assembly 1 comprises an exhaust additive dosing arrangement 11. The exhaust additive dosing arrangement 11 is configured to supply exhaust additive to the stream of exhaust gas in the exhaust system 5 at a position upstream of the SCR catalyst 7. Like above, the feature that the exhaust additive dosing arrangement 11 is configured to supply exhaust additive to the stream of exhaust gas in the exhaust system 5 at a position upstream of the SCR catalyst 7 means that the exhaust additive dosing arrangement 11 is arranged before the SCR catalyst 7 as seen relative a flow direction fd of exhaust gas through the exhaust system 5 during operation of the internal combustion engine 3.

The exhaust additive dosing arrangement 11 may comprise a nozzle configured to inject the exhaust additive to the stream of exhaust gas in the exhaust system 5. The exhaust additive may comprise a reduction agent, such as an aqueous urea solution, anhydrous ammonia, aqueous ammonia, or the like.

The letters "SCR" in the term "SCR catalyst 7" is an abbreviation of "Selective Catalytic Reduction". Hence, the SCR catalyst 7, as referred to herein, may also be referred to as a Selective Catalytic Reduction catalyst. The SCR catalyst 7 comprises a catalytic substrate configured to convert nitrogen oxides NOx into diatomic nitrogen $N_2$, and water $H_2O$ with aid of the exhaust additive supplied to the stream of exhaust gas by the exhaust additive dosing arrangement 11.

The combustion engine assembly 1 comprises a control arrangement 21. During regular operation of the combustion engine assembly 1, the control arrangement 21 may control an injection amount of exhaust additive supplied by the exhaust additive dosing arrangement 11 based on data from the NOx sensor 9. Moreover, the control arrangement 21 may be configured to control some operational aspects of the internal combustion engine 3 based on data from the NOx sensor 9.

According to the illustrated embodiments, the combustion engine assembly 1 comprises a second exhaust additive dosing arrangement 31 and a second SCR catalyst 37. Thus, according to the illustrated embodiments, the combustion engine assembly 1 comprises two SCR catalysts 7, 37 arranged in series. However, the combustion engine assembly 1 may comprise one SCR catalyst 7 only and/or one exhaust additive dosing arrangement 11 only.

The second SCR catalyst 37 is arranged downstream of the SCR catalyst 7, i.e., is arranged after the SCR catalyst 37 as seen relative a flow direction fd of exhaust gas through the exhaust system 5 during operation of the internal combustion engine 3. The second exhaust additive dosing arrangement 31 is arranged downstream of the SCR catalyst 7, downstream of the NOx sensor 9 and upstream of the second SCR catalyst 37. In other words, the second exhaust additive dosing arrangement 31 is arranged between the NOx sensor 9 and the second SCR catalyst 37 as seen relative to a flow direction fd of exhaust gas through the exhaust system 5 during operation of the internal combustion engine 3.

Since the combustion engine assembly 1 according to the illustrated embodiments comprises two SCR catalysts 7, 37 arranged in series, the SCR catalyst 7 as referred to herein, may also be referred to as a first SCR catalyst 7 of an exhaust system 5 comprising two or more SCR catalysts 7, 37, wherein the first SCR catalyst 7 is arranged upstream of the one or more other SCR catalysts 37 of the exhaust system 5.

The second exhaust additive dosing arrangement 31 is configured to supply an exhaust additive to the stream of exhaust gas in the exhaust system 5 at a position upstream of the second SCR catalyst 37 and downstream of the NOx sensor 9. The second SCR catalyst 37 comprises a catalytic substrate configured to convert nitrogen oxides NOx into diatomic nitrogen N2, and water H2O with aid of the exhaust additive supplied to the stream of exhaust gas by the second exhaust additive dosing arrangement 31. The exhaust additive supplied to the stream of exhaust gas by the second exhaust additive dosing arrangement 31 may be of the same type as the exhaust additive supplied to the stream of exhaust gas by the exhaust additive dosing arrangement 11. Since the combustion engine assembly 1 according to the illustrated embodiments comprises two exhaust additive dosing arrangements 11, 31, the exhaust additive dosing arrangement 11, as referred to herein, may also be referred to as a first exhaust additive dosing arrangement.

The combustion engine assembly 1 according to the illustrated embodiments further comprises a second NOx sensor 39. The second NOx sensor 39 is arranged downstream of the second SCR catalyst 37, i.e., is arranged after the second SCR catalyst 37 as seen relative to a flow direction fd of exhaust gas through the exhaust system 5 during operation of the internal combustion engine 3. During regular operation of the combustion engine assembly 1, the control arrangement 21 may control an injection amount of exhaust additive supplied by the second exhaust additive dosing arrangement 31 based on data from the second NOx sensor 39. Moreover, the control arrangement 21 may be configured to control some operational aspects of the internal combustion engine 3 based on data from the second NOx sensor 39.

Since the combustion engine assembly 1 according to the illustrated embodiments comprises two NOx sensors 9, 39, the NOx sensor 9 as referred to herein may also be referred to as a first NOx sensor 9.

According to embodiments herein, the control arrangement 21 is configured to provide a first NOx value v1 using the NOx sensor 9 during a supply period of exhaust additive to the stream of exhaust gas upstream of the SCR catalyst 7 by the exhaust additive dosing arrangement 11. The control arrangement 21 may control the exhaust additive dosing arrangement 11 to supply exhaust additive to the stream of exhaust gas during the supply period.

The control arrangement 21 is further configured to provide a second NOx value v2 using the NOx sensor 9 during a stop period of a supply of exhaust additive to the stream of exhaust gas upstream of the SCR catalyst 7 by the exhaust additive dosing arrangement 11. The control arrangement 21 may be configured to control the exhaust additive dosing arrangement 11 to stop a supply of exhaust additive to the stream of exhaust gas such that no exhaust additive is supplied to the stream of exhaust gas upstream of the SCR catalyst 7 during the stop period. The first and second NOx values v1, v2 are schematically indicated in FIG. 2 as values obtained by the control arrangement 21 using input from the NOx sensor 9.

Each of the first and second NOx values v1, v2 may be representative of a NOx content of the stream of exhaust gas measured by the NOx sensor 9 during the respective supply period and the stop period. Therefore, the first and second NOx values v1, v2, as referred to herein, may also be referred to as a first and a second NOx content value. The term NOx, as used herein, represents several forms of nitrogen oxides including nitric oxide NO and nitrogen dioxide $NO_2$.

Moreover, each of the first and second NOx values v1, v2 may be given a value with a magnitude correlated to the NOx content of the stream of exhaust gas measured by the NOx sensor 9 during the respective supply period and the stop period. Furthermore, each of the first and second NOx values v1, v2 may be given a value such that a larger value indicates a higher NOx content, and a lower value indicates a lower NOx content, of the stream of exhaust gas measured by the NOx sensor 9 during the respective supply period and the stop period.

According to embodiments herein, the control arrangement 21 is configured to diagnose the operational performance of the combustion engine assembly 1 based on a ratio between the first and second NOx values v1, v2.

Since the first NOx value v1 is provided during the supply period, in which exhaust additive is supplied to the stream of exhaust gas upstream of the SCR catalyst 7, and since the second NOx value v2 is provided during the stop period, in which no exhaust additive is supplied to the stream of exhaust gas upstream of the SCR catalyst 7, the ratio between the first and second NOx values v1, v2 can indicate whether a high NOx content in the exhaust gas downstream of the SCR catalyst 7 is caused by an operational fault of the combustion engine 1 or is caused by an operational fault of the SCR catalyst 7.

According to some embodiments, the control arrangement 21 may be configured to control the internal combustion engine 3 to operate within a predetermined speed range when providing the first and second NOx values v1, v2. Moreover, the control arrangement 21 may be configured to control the internal combustion engine 3 to operate within the predetermined speed range during the supply period as well as during the stop period. The predetermined speed range may be within 1 000-1 200 revolutions per minute rpm.

Moreover, the control arrangement 21 may be configured to control the combustion engine assembly 1 to generate an exhaust temperature within a predetermined temperature range when providing the first and second NOx values v1, v2. Furthermore, the control arrangement 21 may be configured to control the combustion engine assembly 1 to generate an exhaust temperature within the predetermined temperature range during the supply period as well as during the stop period. The predetermined temperature range may for example be within 200-300 degrees Celsius, or may be within 250-300 degrees Celsius.

The combustion engine assembly 1 may be controlled to generate an exhaust temperature within a predetermined temperature range by controlling one or more of a fuel injection amount into cylinders 10 of the internal combustion engine 1, a fuel injection duration into cylinders 10 of the internal combustion engine 3, a fuel injection timing into cylinders 10 of the internal combustion engine 3, a timing of opening and/or closing events of engine valves configured to control the flow of gas into and out from the cylinders 10 of the internal combustion engine 3, an opening state of an exhaust throttle arranged in the exhaust system 5 of the combustion engine assembly 1, an opening state of an inlet throttle arranged in an air inlet system of the combustion engine assembly 1, and an amount of fuel injected into the exhaust system 5. That is, the exhaust temperature may be increased by injecting fuel into the exhaust system 5. According to such embodiments, the exhaust system 5 comprises a fuel injector configured to inject fuel into the exhaust system 5.

According to some embodiments, the control arrangement 21 may set a fault indicator of at least one of the internal combustion engine 3 and the SCR catalyst 7 if the ratio between the first and second NOx values v1, v2 is greater than a threshold ratio. Purely as an example, the threshold ratio may be 0.2.

As understood from the above, in embodiments in which the threshold ratio is 0.2, the control arrangement 21 will set a fault indicator of at least one of the internal combustion engine 3 and the SCR catalyst 7 if the second NOx value v2 is less than five times greater than the first NOx value v1. In other words, in embodiments in which the threshold ratio is 0.2, the control arrangement 21 sets a fault indicator of at least one of the internal combustion engine 3 and the SCR catalyst 7 if the first NOx value v1 is greater than 20% of the second NOx value v2. The fault indicator may comprise a fault code which may be saved into a memory, and/or which may be outputted to an external diagnostics tool, and/or on a user interface in a driver environment of a vehicle 2 comprising the control arrangement 21.

Figure 3:
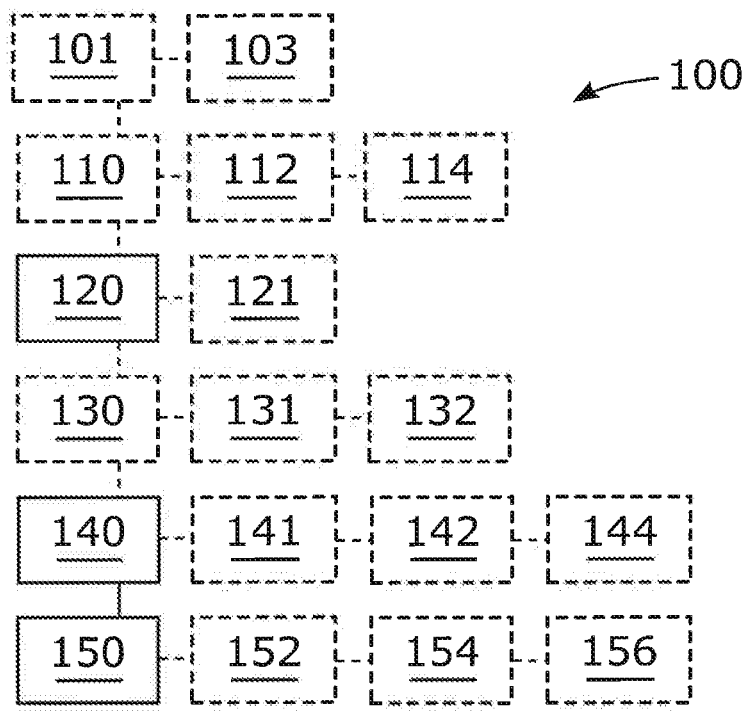

FIG. 3 schematically illustrates a method 100 of diagnosing an operational performance of a combustion engine assembly. The combustion engine assembly may be a combustion engine assembly 1 according to the embodiments illustrated in FIG. 2, i.e., a combustion engine assembly 1 of a vehicle 2 illustrated in FIG. 1. Therefore, below, simultaneous reference is made to FIG. 1-FIG. 3, if not indicated otherwise.

The method 100 is a method of diagnosing an operational performance of a combustion engine assembly 1, wherein the combustion engine assembly 1 comprises an internal combustion engine 3 and an exhaust system 5 configured to conduct a stream of exhaust gas from the internal combustion engine 3, wherein the exhaust system 5 comprises a SCR catalyst 7 and a NOx sensor 9 arranged downstream of the SCR catalyst 7, and wherein the method 100 comprises the steps of:

providing 120 a first NOx value v1 using the NOx sensor 9 during a supply period of an exhaust additive to the stream of exhaust gas upstream of the SCR catalyst 7, providing 140 a second NOx value v2 using the NOx sensor 9 during a stop period of a supply of exhaust additive to the stream of exhaust gas upstream of the SCR catalyst 7, and diagnosing 150 the operational performance of the combustion engine assembly 1 based on a ratio between the first and second NOx values v1, v2.

The step of diagnosing 150 the operational performance of the combustion engine assembly 1 is performed after the steps of providing 120, 140 the first and second NOx values v1, v2.

Figure 4A:
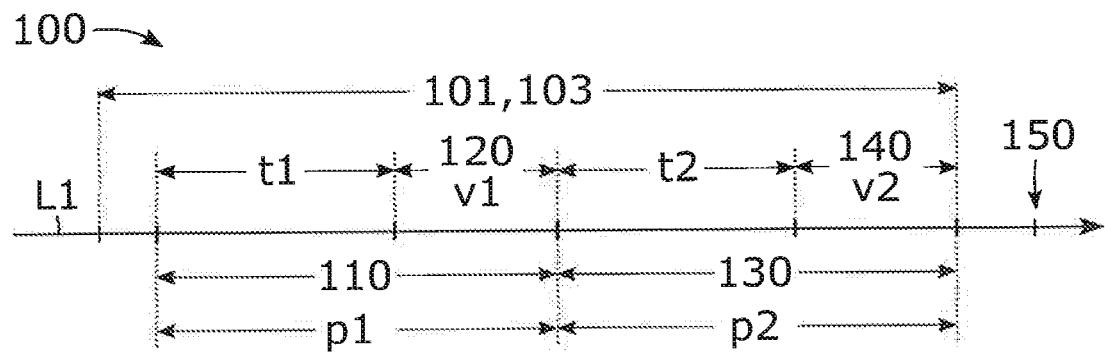

FIG. 4a schematically illustrates a first timeline L1 indicating when some of the steps of the method 100 according to embodiments herein may be performed. As seen in FIG. 4a, step of diagnosing 150 the operational performance of the combustion engine assembly 1 is performed after the steps of providing 120, 140 the first and second NOx values v1, v2.

The supply period p1 is indicated in FIG. 4a with the reference sign "p1" and the stop period p2 is indicated with the reference sign "p2". As clearly seen in FIG. 4a, the step of providing 120 the first NOx value v1 is performed during the supply period p1 and the step of providing 140 the second NOx value v2 is performed during the stop period p2.

According to the first timeline L1 of FIG. 4a, the step of providing 120 the first NOx value v1 is performed prior to the step of providing 140 the second NOx value v2 and the supply period p1 precedes the stop period p2.

However, according to some embodiments, the step of providing 140 the second NOx value v2 may be performed prior to the step of providing 120 the first NOx value v1 and the stop period p2 may accordingly precede the supply period p1.

Figure 4B:
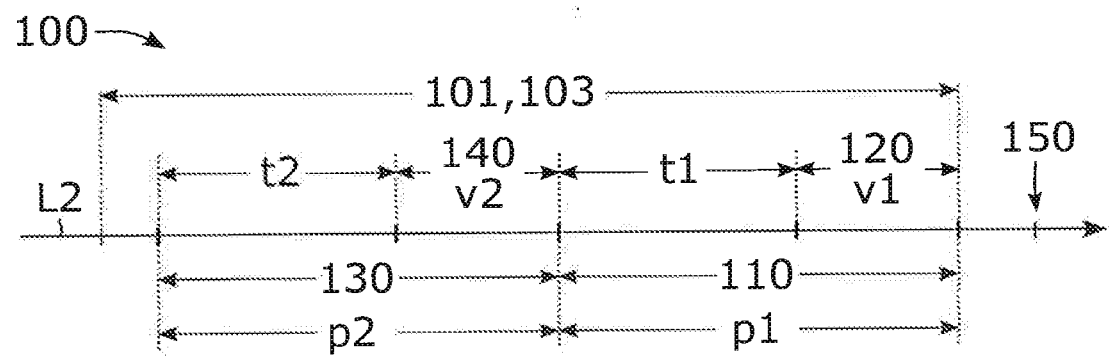

FIG. 4b schematically illustrates a second timeline L2 indicating when some of the steps of the method 100 according to embodiments herein may be performed. According to the second timeline L2 of FIG. 4b, the step of providing 140 the second NOx value v2 is performed prior to the step of providing 120 the first NOx value v1. Moreover, as seen in FIG. 4b, the stop period p2 precedes the supply period p1. Below, simultaneous reference is made to FIG. 1-FIG. 4b, if not indicated otherwise.

As indicated in FIG. 3, FIG. 4a and FIG. 4b, the method 100 may comprise the step of:

controlling 101 the internal combustion engine 3 to operate within a predetermined speed range during the steps of providing 120, 140 the first and second NOx values v1, v2.

Moreover, as indicated in FIG. 3, FIG. 4a and FIG. 4b, the method 100 may comprise the step of:

controlling 103 the combustion engine assembly 1 to generate an exhaust temperature within a predetermined temperature range during the steps of providing 120, 140 the first and second NOx values v1, v2.

Furthermore, as is seen in FIG. 4a as well as in FIG. 4b, the step of controlling 101 the internal combustion engine 3 to operate within the predetermined speed range and the step of controlling 103 the combustion engine assembly 1 to generate an exhaust temperature within the predetermined temperature range may be performed during the full supply period p1 and the full stop period p2.

Moreover, as indicated in FIG. 3, FIG. 4a and FIG. 4b, the method 100 may comprise the step of:

supplying 110 exhaust additive to the stream of exhaust gas upstream of the SCR catalyst 7 during the supply period p1.

According to some embodiments, the combustion engine assembly 1 comprises an exhaust additive dosing arrangement 11 configured to supply the exhaust additive to the stream of exhaust gas in the exhaust system 5 at a position upstream of the SCR catalyst 7, and wherein the method 100 may comprise the step of, as is indicated in FIG. 3:

supplying 112 exhaust additive to the stream of exhaust gas by controlling the exhaust additive dosing arrangement 11 to supply the exhaust additive to the stream of exhaust gas during the supply period p1.

Moreover, as is indicated in FIG. 3, the method 100 may comprise the step of:

supplying 114 a predetermined flow rate of exhaust additive to the stream of exhaust gas upstream of the SCR catalyst 7 during the supply period p1.

The predetermined flow rate of exhaust additive to the stream of exhaust gas may be controlled to a setpoint of approximately 70%-80% NOx conversion in the SCR catalyst 7.

Moreover, the step of providing 120 the first NOx value v1 may comprise the step of:

providing 121 the first NOx value v1 a predetermined time t1 after an initiation of the supply period p1.

That is, according to these embodiments, the first NOx value v1 may be provided a predetermined time t1 after an initiation of the supply period p1, i.e., a predetermined time t1 after an initiation of the step of supplying 110 exhaust additive to the stream of exhaust gas upstream of the SCR catalyst 7. In this manner, it can be ensured that input data from the NOx sensor 9 stabilizes which provides accurate and reliable first NOx values v1. The method step of providing 121 the first NOx value v1 a predetermined time t1 after an initiation of the supply period p1 is indicated in FIG. 3 and the predetermined time t1 is indicated in FIG. 4a and FIG. 4b.

Moreover, as is indicated in FIG. 3, FIG. 4a and FIG. 4b, the method may comprise the step of:

stopping 130 a supply of exhaust additive to the stream of exhaust gas upstream of the SCR catalyst 7 during the stop period p2.

According to some embodiments, the combustion engine assembly 1 comprises an exhaust additive dosing arrangement 11 configured to supply the exhaust additive to the stream of exhaust gas in the exhaust system 5 at a position upstream of the SCR catalyst 7, and wherein the method 100 may comprise the step of, as is indicated in FIG. 3:

stopping 131 the supply of exhaust additive to the stream of exhaust gas upstream of the SCR catalyst 7 by controlling the exhaust additive dosing arrangement 11 to not supply exhaust additive to the stream of exhaust gas during the stop period p2.

In other words, the method 100 may comprise the step of, prior to the step of providing 140 the second NOx value v2:

initiating 132 the stop period p2 by controlling 132 the exhaust additive dosing arrangement 11 to stop the supply of exhaust additive to the stream of exhaust gas.

Moreover, the step of providing 140 the second NOx value v2 may comprise the step of:

providing 141 the second NOx value v2 a predetermined time t2 after an initiation of the stop period p2.

That is, according to these embodiments, the second NOx value v2 may be provided a predetermined time t2 after an initiation of the stop period p2, i.e., a predetermined time t2 after the step of initiating 132 the stop period p2. In this manner, it can be ensured that any exhaust additive accumulated onto the catalyst substrate of the SCR catalyst 7 is removed from the catalyst substrate before providing the second NOx value v2, which provides conditions for more accurate second NOx values v2.

The predetermined time t2 may be determined using a SCR storage model with exhaust mass flow and exhaust temperature as input values, i.e., mass flow of exhaust gas flowing through the exhaust system 5 and an exhaust temperature of exhaust gas flowing through the exhaust system 5. In case of higher exhaust mass flows and exhaust temperatures, a shorter predetermined time t2 can be utilized and vice versa. The step of providing 141 the second NOx value v2 a predetermined time t2 after an initiation of the stop period p2 is indicated in FIG. 3, and the predetermined time t2 is indicated in FIG. 4a and FIG. 4b.

As indicated in FIG. 3, the step of diagnosing 150 the performance of the combustion engine assembly 1 may comprise the step of:

setting 152 a fault indicator of at least one of the internal combustion engine 3 and the SCR catalyst 7 if the ratio between the first and second NOx values v1, v2 is greater than a threshold ratio.

Moreover, as is indicated in FIG. 3, the method 100 may comprise the steps of:

providing 142 current operational data of the internal combustion engine 3 during the step of providing 140 the second NOx value v2, and providing 144 a specific NOx content value based on the second NOx value v2 and on the current operational data, and wherein the step of diagnosing 150 the performance of the combustion engine assembly 1 comprises the step of:

setting 154 a fault indicator of the SCR catalyst 7 if the ratio between the first and second NOx values v1, v2 is greater than the threshold ratio and the specific NOx content value is smaller than a threshold value.

The current operational data of the internal combustion engine 3 may comprise data representative of one or more of a current engine power of the internal combustion engine 3, a current engine load of the internal combustion engine 3, and a current mass flow of exhaust gas in the exhaust system 5.

The specific NOx content value indicates a NOx content of the exhaust gas related to the mass flow of exhaust gas and the current engine power. The specific NOx content value may be calculated using the following formula:

$$(M_f * K * v_2)/P$$

where
Mf=mass flow of exhaust gas through the exhaust system 5,
K=a constant,
v2=the second NOx value v2, and
P=power produced by the internal combustion engine 3.

The unit for the specific NOx content value may be weight of NOx/kWh. The threshold value for the specific NOx content value may for example be within the range of 1-20 g/kWh or may be within the range of 10-16 g/kWh.

Since the specific NOx content value is based on the second NOx value v2, which is provided during the stop period p2, the specific NOx content value can give a reliable indication of the NOx generation of the internal combustion engine 3. This is because it can be expected that no conversion of NOx occurs in the SCR catalyst 7 during the provision of the second NOx value v2.

Since the first NOx value v1 is provided during the supply period p1, in which exhaust additive is supplied to the stream of exhaust gas inside the exhaust system 5 at a position upstream of the SCR catalyst 7, a conversation of NOx in the SCR catalyst 7 can be expected.

Therefore, if the ratio between the first and second NOx values v1, v2 is greater than the threshold ratio and the specific NOx content value is smaller than a threshold value, a conclusion can be made that the high ratio between the first and second NOx values v1, v2 is caused by an insufficient NOx conversion rate in the SCR catalyst 7. An insufficient NOx conversion rate in the SCR catalyst 7 may be caused by an operational fault of the SCR catalyst 7.

If the specific NOx content value is greater than a threshold value, a conclusion can be made that the internal combustion engine 3 generates an excessive amount of NOx, which may be caused by an operational fault of the internal combustion engine 3.

As is indicated in FIG. 3, the step of diagnosing 150 the performance of the combustion engine assembly 1 may comprise the step of:
 setting 156 a fault indicator of the internal combustion engine 3 if the ratio between the first and second NOx values v1, v2 is greater than the threshold ratio and the specific NOx content value is greater than a threshold value.

Thus, by the features of the method 100 according to the embodiments herein, a simple, efficient, and reliable method 100 is provided having conditions for distinguishing whether a high NOx content in the exhaust gas downstream of the SCR catalyst 7 is caused by an operational fault of the combustion engine 3 or is caused by an operational fault of the SCR catalyst 7.

Moreover, a method 100 is provided having conditions for circumventing, or at least reducing, the need for a NOx sensor upstream of the SCR catalyst 7 where harsher conditions are prevalent in terms of pressure and temperatures as compared to portions downstream of the SCR catalyst 7. Accordingly, a method 100 is provided having conditions for improving durability and reliability of combustion engine assemblies 1 as well as having conditions for reducing manufacturing and assembling costs of combustion engine assemblies 1.

Any of the herein described fault indicators may comprise a specific fault code. Moreover, any of the herein described fault indicators may indicate an operational fault in the internal combustion engine 3 and/or in the SCR catalyst 7. A fault indicator being set in any of the method steps 152, 154, and 156 may be saved into a memory, and/or may be outputted to, and/or on, another device such as an external diagnostics tool, and/or may be outputted on a user interface in a driver environment of a vehicle 2 comprising the combustion engine assembly 1.

Some or all of the steps 101, 103, 110, 112, 114, 120, 121, 130, 132, 140, 141, 142, 144, 150, 152, 154, and 156 of the method 100 may be performed during travelling of a vehicle 2 comprising the combustion engine assembly 1, or during vehicle standstill of a vehicle comprising the combustion engine assembly 1, such as during vehicle standstill at a workshop for vehicles.

It will be appreciated that the various embodiments described for the method 100 are all combinable with the control arrangement 21 as described herein. That is, the control arrangement 21 may be configured to perform any one of the method steps 101, 103, 110, 112, 114, 120, 121, 130, 132, 140, 141, 142, 144, 150, 152, 154, and 156 of the method 100.

Figure 5:
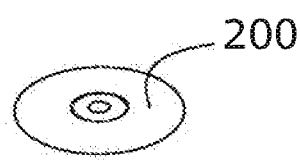
FIG. 5 illustrates a computer-readable medium.

FIG. 5 illustrates a computer-readable medium 200 comprising instructions which, when executed by a computer, cause the computer to carry out the method 100 according to some embodiments.

According to some embodiments, the computer-readable medium 200 comprises a computer program comprising instructions which, when the program is executed by a computer, cause the computer to carry out the method 100 according to some embodiments. Below, simultaneous reference is made to FIG. 1-FIG. 5, if not indicated otherwise.

The control arrangement 21, as referred to herein, may be comprised in the combustion engine assembly 1, and/or in a vehicle 2 comprising the combustion engine assembly 1, and may be operably connected to one or more components of the combustion engine assembly 1 in order to perform the method 100 illustrated in FIG. 3, FIG. 4a and FIG. 4b.

One skilled in the art will appreciate that the method 100 of diagnosing an operational performance of a combustion engine assembly 1 may be implemented by programmed instructions. These programmed instructions are typically constituted by a computer program, which, when it is executed in the control arrangement 21, ensures that the control arrangement 21 carries out the desired control, such as the method steps 101, 103, 110, 112, 114, 120, 121, 130, 132, 140, 141, 142, 144, 150, 152, 154, and 156 described herein. The computer program is usually part of a computer program product 200 which comprises a suitable digital storage medium on which the computer program is stored.

The control arrangement 21 may comprise a calculation unit which may take the form of substantially any suitable type of processor circuit or microcomputer, e.g., a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The control arrangement 21 may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g., a memory card, a flash memory, a USB memory, a hard disc, or another similar volatile or non-volatile storage unit for storing data such as e.g., ROM (Read-Only Memory), PROM (Programmable Read-Only Memory), EPROM (Erasable PROM), EEPROM (Electrically Erasable PROM), etc. in different embodiments.

The control arrangement 21 may be connected to components of the combustion engine assembly 1 for receiving and/or sending input and output signals. These input and output signals may comprise waveforms, pulses, or other attributes which the input signal receiving devices can detect as information and which can be converted to signals processable by the control arrangement 21. These signals may then be supplied to the calculation unit. One or more output signal sending devices may be arranged to convert calculation results from the calculation unit to output signals for conveying to other parts of the vehicle's control system and/or the component or components for which the signals are intended. Each of the connections for receiving and sending input and output signals may take the form of one or more from among a cable, a data bus, e.g., a CAN (controller area network) bus, a MOST (media orientated systems transport) bus or some other bus configuration, or a wireless connection.

In the embodiments illustrated, the combustion engine assembly 1 comprises a control arrangement 21 but might alternatively be implemented wholly or partly in two or more control arrangements or two or more control units. Moreover, at least part of the control arrangement 21 may be implemented in an external device, such as an external diagnostic tool for combustion engine assemblies 1.

Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be shared between two or more of them. Combustion engine assemblies 1 of the type here concerned are therefore often provided with significantly more control arrangements than depicted in FIG. 2, as one skilled in the art will surely appreciate.

The computer program product 200 may be provided for instance in the form of a data carrier carrying computer program code for performing at least some of the method steps 101, 103, 110, 112, 114, 120, 121, 130, 132, 140, 141, 142, 144, 150, 152, 154, and 156 according to some embodiments when being loaded into one or more calculation units of the control arrangement 21. The data carrier may be, e.g. a CD ROM disc, as is illustrated in FIG. 5, or a ROM (read-only memory), a PROM (programmable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control arrangement 21 remotely, e.g., over an Internet or an intranet connection, or via other wired or wireless communication systems.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

The invention claimed is:

1. A method of diagnosing an operational performance of a combustion engine assembly, the combustion engine assembly comprising:
    an internal combustion engine, and
    an exhaust system configured to conduct a stream of exhaust gas from the internal combustion engine,
the exhaust system comprising a SCR catalyst and a NOx sensor arranged downstream of the SCR catalyst,
and wherein the method comprises the steps of:
    providing a first NOx value (v1) using the NOx sensor during a supply period (p1) of an exhaust additive to the stream of exhaust gas upstream of the SCR catalyst,
    providing a second NOx value (v2) using the NOx sensor during a stop period (p2) of a supply of exhaust additive to the stream of exhaust gas upstream of the SCR catalyst, and
    diagnosing the operational performance of the combustion engine assembly based on a ratio between the first and second NOx values (v1, v2),
wherein the step of diagnosing the operational performance of the combustion engine assembly comprises the step of setting a fault indicator of at least one of the internal combustion engine and the SCR catalyst if the ratio between the first and second NOx values (v1, v2) is greater than a threshold ratio, and
wherein the method further comprises steps of:
    providing current operational data of the internal combustion engine during the step of providing the second NOx value (v2), and
    providing a specific NOx content value based on the second NOx value (v2) and on the current operational data, and
wherein the step of diagnosing the operational performance of the combustion engine assembly further comprises the steps of:
    setting a fault indicator of the SCR catalyst if the ratio between the first and second NOx values (v1, v2) is greater than the threshold ratio and the specific NOx content value is smaller than a threshold value, and
    setting a fault indicator of the internal combustion engine if the specific NOx content value is greater than the threshold value.

2. The method according to claim 1, wherein the method comprises the step of:
    controlling the internal combustion engine to operate within a predetermined speed range during the steps of providing the first and second NOx values (v1, v2).

3. The method according to claim 1, wherein the method comprises the step of:
    controlling the combustion engine assembly to generate an exhaust temperature within a predetermined temperature range during the steps of providing the first and second NOx values (v1, v2).

4. The method according to claim 1, wherein the step of providing the second NOx value (v2) comprises the step of:
   providing the second NOx value (v2) a predetermined time (t2) after an initiation of the stop period (p2).

5. The method according to claim 1, wherein the method comprises the step of:
   supplying a predetermined flow rate of exhaust additive to the stream of exhaust gas upstream of the SCR catalyst during the supply period (p1).

6. The method according to claim 1, wherein the combustion engine assembly comprises an exhaust additive dosing arrangement configured to supply the exhaust additive to the stream of exhaust gas in the exhaust system at a position upstream of the SCR catalyst, and wherein the method comprises the step of:
   supplying exhaust additive to the stream of exhaust gas by controlling the exhaust additive dosing arrangement to supply the exhaust additive to the stream of exhaust gas during the supply period (p1).

7. The method according to claim 6, wherein the method comprises the step of, prior to the step of providing the second NOx value (v2):
   initiating the stop period (p2) by controlling the exhaust additive dosing arrangement to stop the supply of exhaust additive to the stream of exhaust gas.

8. A computer-readable medium comprising instructions which, when executed by a computer, cause the computer to carry out the method according to claim 1.

9. A control arrangement for a combustion engine assembly, the combustion engine assembly comprising:
   an internal combustion engine, and
   an exhaust system configured to conduct a stream of exhaust gas from the internal combustion engine, the exhaust system comprising a SCR catalyst and a NOx sensor arranged downstream of the SCR catalyst,
   wherein the control arrangement is configured to:
      provide a first NOx value (v1) using the NOx sensor during a supply period (p1) of an exhaust additive to the stream of exhaust gas upstream of the SCR catalyst,
      provide a second NOx value (v2) using the NOx sensor during a stop period (p2) of a supply of exhaust additive to the stream of exhaust gas upstream of the SCR catalyst, and
      diagnose operational performance of the combustion engine assembly based on a ratio between the first and second NOx values (v1, v2),
   wherein the control arrangement is configured to diagnose the operational performance of the combustion engine assembly by setting a fault indicator of at least one of the internal combustion engine and the SCR catalyst if the ratio between the first and second NOx values (v1, v2) is greater than a threshold ratio, and
   wherein the control arrangement is further configured to:
      provide current operational data of the internal combustion engine during the providing the second NOx value (v2), and
      provide a specific NOx content value based on the second NOx value (v2) and on the current operational data, and
   wherein the control arrangement is configured to diagnose the operational performance of the combustion engine assembly by:
      setting a fault indicator of the SCR catalyst if the ratio between the first and second NOx values (v1, v2) is greater than the threshold ratio and the specific NOx content value is smaller than a threshold value, and
      setting a fault indicator of the internal combustion engine if the specific NOx content value is greater than the threshold value.

* * * * *